US008535424B1

(12) United States Patent
Bryan et al.

(10) Patent No.: US 8,535,424 B1
(45) Date of Patent: Sep. 17, 2013

(54) PROCESS AND APPARATUS FOR SEPARATION OF COMPONENTS OF A GAS STREAM

(75) Inventors: Charles R. Bryan, Albuquerque, NM (US); John R. Torczynski, Albuquerque, NM (US); Patrick V. Brady, Albuquerque, NM (US); Michail Gallis, Albuquerque, NM (US); Carlton F. Brooks, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 295 days.

(21) Appl. No.: 12/976,036

(22) Filed: Dec. 22, 2010

Related U.S. Application Data

(60) Provisional application No. 61/377,291, filed on Aug. 26, 2010.

(51) Int. Cl.
*B01D 59/16* (2006.01)
(52) U.S. Cl.
USPC ................................. 96/221; 95/34; 95/289
(58) Field of Classification Search
USPC .............................................. 95/289; 96/221
See application file for complete search history.

(56) References Cited

U.S. PATENT DOCUMENTS

| 4,313,807 | A | 2/1982 | de Mévergnies et al. |
| 6,733,569 | B2 | 5/2004 | Geller et al. |

OTHER PUBLICATIONS

Yeh, Ho-Ming. Deuterium recovery from water-isotope mixture by thermal diffusion in countercurrent-flow Frazier scheme inclined for improved performance. Department of Chemical and Materials Engineering, Tamkang University Tamsui, Taipei County 251, Taiwan. Accepted: Elsevier B.V. Jan. 6, 2008.*
Amdur, I. et al. "Diffusion Coefficients of the Systems $CO_2$-$CO_2$ and $CO_2$-$N_2O$." *The Journal of Chemical Physics.* vol. 20, No. 3 (Mar. 1952), pp. 436-443, New York, USA.
Bastick, R. et al. "The Molecular Fields of Carbon Dioxide and Nitrous Oxide." *Proceedings of the Royal Society of London. Series A, Mathematical and Physical Sciences.* vol. 173, No. 955 (Dec. 29, 1939), pp. 543-554, London, UK.
Grew, K. et al. "Thermal Diffusion in Gases." Cambridge University Press, 1952, pp. 6-7, 90-93, New York, USA.
Jones, R. et al. "The Separation of Isotopes by Thermal Diffusion." *Reviews of Modern Physics.* vol. 18, No. 2 (Apr. 1946), pp. 151-224, USA.

(Continued)

*Primary Examiner* — Duane Smith
*Assistant Examiner* — Joubert X Glover
(74) *Attorney, Agent, or Firm* — Daniel J. Jenkins

(57) ABSTRACT

A process and apparatus for separating a gas mixture comprising providing a slot in a gas separation channel (conceptualized as a laterally elongated Clusius-Dickel column), having a length through which a net cross-flow of the gas mixture may be established; applying a higher temperature to one side of the channel and a lower temperature on an opposite side of the channel thereby causing thermal-diffusion and buoyant-convection flow to occur in the slot; and establishing a net cross-flow of a gas mixture comprising at least one higher density gas component and at least one lower density gas component along the length of the slot, wherein the cross-flow causes, in combination with the convection flow, a spiraling flow in the slot; and wherein the spiral flow causes an increasing amount of separation of the higher density gas from the lower density gas along the length of the channel. The process may use one or more slots and/or channels.

16 Claims, 18 Drawing Sheets

(56) References Cited

OTHER PUBLICATIONS

Winn, Edward B. "The Temperature Dependence of the Self-Diffusion Coefficients of Argon, Neon, Nitrogen, Oxygen, Carbon Dioxide, and Methane." *Physical Review*. vol. 80, No. 6 (Dec. 15, 1950), pp. 1024-1027, USA.

Torczynski, J.R. et al., "Computational Investigation of Thermal Gas Separation for $CO_2$ Capture", Sandia National Laboratories, Sandia Report SAND2009-5705, Jan. 18, 2010.

Frame, H.D. et al., "Continuous Separation of Gaseous Mixtures by Thermal Gravitational Diffusion", Argonne National Labs, ACS, vol. 33, No. 12, Nov. 1961.

Perry, R.H., et al., Perry's Chemical Engineer's Handbook, $6^{th}$ Ed., Sec. 17 "Novel Separation Processes", pp. 17-66 to 17-72, Jan. 1984.

Rutherford, W.M. et al, "Experimental Verification of the Thermal Diffusion Column Theory as Applied to the Separation of Isotopically Substituted Nitrogen and Oxygen", Journal of Chemical Physics, Vo. 50, No. 12, Jun. 15, 1969.

Rutherford, W.M. et al, "Experimental Verification, with Krypton, of the Theory of the Thermal-Diffusion Column for Multicomponent Systems", Journal of Chemical Physics, Vo. 50, No. 1, Jan. 1, 1969.

Thomas, W.J., et al., "The Separation of Common Gases by Thermal Diffusion", Chemical Engineering Science, vol. 5, pp. 34-49, 1956.

Thomas, W.J., et al., "The Separation of Multicomponent Mixtures of Common Gases by Thermal Diffusion", Chemical Engineering Science, vol. 6, pp. 26-34, 1956.

D'Allesandro, et al., "Carbon Dioxide Capture: Prospects for New Materials", Angewandte Chemie Int. Ed. 2010, vol. 49, pp. 6058-6082, Jul. 22, 2010.

* cited by examiner

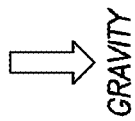

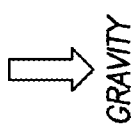
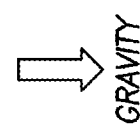

FIG.4M

| FLOW-6 | | | | | | | | |
|---|---|---|---|---|---|---|---|---|
| 50 | 52 | 52 | 53 | 53 | 53.5 | 53.5 | 53.5 | 53.5 |
| 50 | 52 | 54 | 55 | 56 | 56.5 | 57 | 57 | 57 |
| 50 | 52 | 52 | 51 | 51 | 50.5 | 50.5 | 50.5 | 50.5 |
| 50 | 48 | 50 | 51 | 52 | 52.5 | 53 | 53 | 53 |
| 50 | 52 | 50 | 49 | 48 | 47.5 | 47 | 47 | 47 |
| 50 | 48 | 48 | 49 | 49 | 49.5 | 49.5 | 49.5 | 49.5 |
| 50 | 48 | 46 | 45 | 44 | 43.5 | 43 | 43 | 43 |
| 50 | 48 | 48 | 47 | 47 | 46.5 | 46.5 | 46.5 | 46.5 |

FIG.4N

| EQUILIBRATE-7 | | | | | | | | |
|---|---|---|---|---|---|---|---|---|
| 52 | 54 | 55 | 56 | 56.5 | 57 | 57.25 | 57.25 | |
| 48 | 50 | 51 | 52 | 52.5 | 53 | 53.25 | 53.25 | |
| 52 | 52 | 53 | 53 | 53.5 | 53.5 | 53.75 | 53.75 | |
| 48 | 48 | 49 | 49 | 49.5 | 49.5 | 49.75 | 49.75 | |
| 52 | 52 | 51 | 51 | 50.5 | 50.5 | 50.25 | 50.25 | |
| 48 | 48 | 47 | 47 | 46.5 | 46.5 | 46.25 | 46.25 | |
| 52 | 50 | 49 | 48 | 47.5 | 47 | 46.75 | 46.75 | |
| 48 | 46 | 45 | 44 | 43.5 | 43 | 42.75 | 42.75 | |

→ GRAVITY

| FLOW-7 | | | | | | | | |
|---|---|---|---|---|---|---|---|---|
| 50 | 52 | 52 | 53 | 53 | 53.5 | 53.5 | 53.75 | 53.75 |
| 50 | 52 | 54 | 55 | 56 | 56.5 | 57 | 57.25 | 57.25 |
| 50 | 48 | 52 | 51 | 51 | 50.5 | 50.5 | 50.25 | 50.25 |
| 50 | 52 | 50 | 51 | 52 | 52.5 | 53 | 53.25 | 53.25 |
| 50 | 48 | 50 | 49 | 48 | 47.5 | 47 | 46.75 | 46.75 |
| 50 | 48 | 48 | 49 | 49 | 49.5 | 49.5 | 49.75 | 49.75 |
| 50 | 48 | 46 | 45 | 44 | 43.5 | 43 | 42.75 | 42.75 |
| 50 | 48 | 48 | 47 | 47 | 46.5 | 46.5 | 46.25 | 46.25 |

FIG.4P

| EQUILIBRATE-8 | | | | | | | | |
|---|---|---|---|---|---|---|---|---|
| 52 | 54 | 55 | 56 | 56.5 | 57 | 57.25 | 57.5 | |
| 48 | 50 | 51 | 52 | 52.5 | 53 | 53.25 | 53.5 | |
| 52 | 52 | 53 | 53 | 53.5 | 53.5 | 53.75 | 53.75 | |
| 48 | 48 | 49 | 49 | 49.5 | 49.5 | 49.75 | 49.75 | |
| 52 | 52 | 51 | 51 | 50.5 | 50.5 | 50.25 | 50.25 | |
| 48 | 48 | 47 | 47 | 46.5 | 46.5 | 46.25 | 46.25 | |
| 52 | 50 | 49 | 48 | 47.5 | 47 | 46.75 | 46.5 | |
| 48 | 46 | 45 | 44 | 43.5 | 43 | 42.75 | 42.5 | |

→ GRAVITY

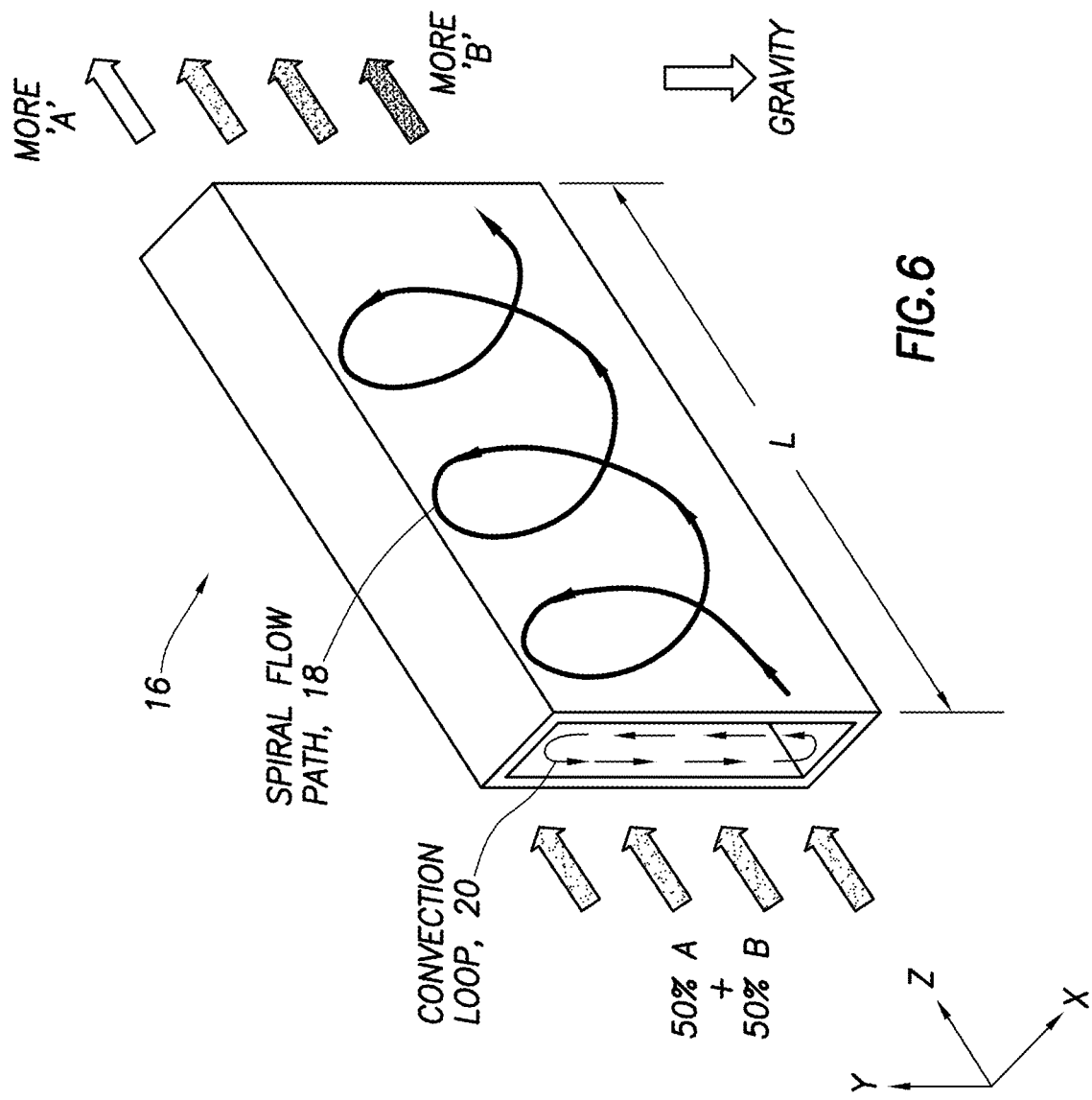

· Neutral Flow

• Stable Flow

- Unstable Flow

• Neutral Flow

- Stable Flow

- Unstable Flow

PROCESS AND APPARATUS FOR SEPARATION OF COMPONENTS OF A GAS STREAM

CROSS REFERENCE TO RELATED APPLICATION

This application claims the benefit of U.S. Provisional Application No. 61/377,291 filed Aug. 26, 2010, the entire contents of which is hereby incorporated by reference.

STATEMENT OF GOVERNMENT INTEREST

This invention was developed under Contract DE-AC04-94AL85000 between Sandia Corporation and the U.S. Department of Energy. The U.S. Government has certain rights in the invention.

FIELD OF THE INVENTION

This invention relates to a process and apparatus for separating two gases having different weights in a multiple-gas mixture. More specifically, the invention relates to the use of combined thermal-diffusive separation with advecting-convecting cross-flow to achieve high throughput and high-efficiency gas separation.

BACKGROUND OF THE INVENTION

A number of natural and artificial gas mixtures contain two or more gases having different weights or densities. For example, such separation processes are useful in large-scale industrial processes such as petroleum refining, air separation, and recovery of carbon dioxide from power plant flue gases for geologic storage, as well as for smaller-scale processes such as isotope separation and chemical analysis. A sufficiently efficient and cost-effective mechanism for such gas separation could also be used for extremely large-scale projects, such as the removal of greenhouse gases, primarily carbon dioxide, from air.

Thermal diffusion occurs in non-isothermal gas mixtures. More specifically, lighter components are preferentially concentrated in the hotter regions, and heavier components are preferentially concentrated in the colder regions. That is, a quiescent gas mixture with a steady temperature gradient also has a concentration gradient. This separation is known as the Soret effect. In other words, if a two-component gas is enclosed in a chamber that is heated on one side and cooled on the other, a compositional gradient will develop in the chamber; with the lighter gas species becoming slightly more concentrated on the hotter side of the chamber, and the heavier species becoming slightly more concentrated on the cooler side. In a simple, static system, however, incomplete separation occurs resulting in only a minor variation in the composition of the gas between the hotter and colder regions. Thermal separation of gases, therefore, is not a practical solution for efficient separation of gas components in a gas mixture.

It is known that combining thermal-diffusive separation with convective flow can result in larger degrees of gas separation than that achievable solely with thermal separation. The best-known mechanism for illustrating this effect is the Clusius-Dickel column. Separation in a Clusius-Dickel column occurs by thermal diffusion that is enhanced by convection. The Clusius-Dickel column is a counter-flow device, meaning that the convecting air streams are moving in opposite directions (in a closed-loop fashion), while also diffusively equilibrating. A Clusius-Dickel column consists of a gas-filled tube cooled on the outside with a water jacket and with a heated wire in the center. However, this radial geometry is most easily conceptualized as a slot, with a hot side and a cool side, as shown in FIGS. 1A and 1B. FIG. 1A illustrates a conventional Clusius-Dickel column with an initial 50-50 mixture of a component A gas which is lighter than a component B gas. A convective flow occurs due to the temperature gradient and the difference in densities in components A and B. FIG. 1B illustrates that following some period of convective flow, the lighter component A concentrates at the top of the column and the heavier component B concentrates at the bottom of the column. As will be understood, the component gases A and B do not sharply separate at the top and bottom sections of the Clusius-Dickel column, but rather a gradation with increasing concentration of component A develops from the center of the column to the top of the column. Likewise a gradation with increasing concentration of component B develops from the center of the column to the bottom of the column.

FIG. 2 schematically illustrates how buoyant convection enhances thermal separation. FIG. 2 schematically illustrates a Clusius-Dickel column bounded by a cold wall on the left side and a hot wall on the right side, wherein the column is theoretically partitioned into square cells, with the gap spanned by two cells. Each of the cells of the Clusius-Dickel column is filled with a binary gas mixture containing 50% of a first lower density (i.e., lighter) gas and 50% of a second higher density (i.e., heavier) gas. In FIG. 2, the numbers indicate the concentration of a hypothetical heavier component in a two-component gas mixture. Thermal diffusion, solely, produces a lateral concentration difference of about 4%, for example. Buoyant convection causes the gas to be transported upward on the right side, leftward at the top, downward on the left side, and rightward on the bottom of the column. If alternating steps of thermal diffusion and buoyant convection in a theoretical model are applied as shown in FIG. 2, and the cell values averaged following these two processes, the average value of concentration of the heavier gas is shown in FIG. 2. After each successive pair of thermal-diffusion and buoyant-convection steps, the vertical concentration variation increases, with the ultimate limit shown in the lower right of FIG. 2. In this highly simplified example, thermal diffusion alone can produce only a 4% difference (i.e., 52% vs. 48% of the heavier gas component), whereas thermal diffusion and buoyant convection in combination can produce a 28% difference (i.e., 64% vs. 36%) from bottom to top, which is a 7-fold improvement. In this example, the separation that ultimately can be achieved is determined by the values assumed for lateral thermal separation (i.e., 52% vs. 48%) and the number of cells in the vertical direction (i.e., 8). In principle, an infinite number of cells in the vertical direction would lead to complete separation at the bottom and top of the column (i.e., 100% vs. 0%, rather than 64% vs. 36%), even when the mass ratio is near unity, as for isotopes. However, infinite time is required to achieve such separation.

The Clusius-Dickel column is a batch system—that is, the column is filled with a fixed volume of gas and allowed to reach a steady state condition over a long period of time. The bulk concentration of such a system does not change; only a tiny amount of the highly enriched gas species of interest can be extracted from the end of the tube. Therefore, it would be desirable to have a cost-effective and fast process for separating a gas mixture containing a lighter gas and a heavier gas, resulting in complete or near complete separation of the two gas components, in a continuously flowing stream of the gas mixture. This would allow continuous sampling of the purified components.

SUMMARY OF THE INVENTION

The invention is a process and an apparatus for separating a gas mixture having a heavy gas component and a lighter gas component in a continuously flowing stream of the gas mixture.

A first aspect of the invention provides a process for separating a gas mixture comprising: providing a slot in a channel in the form of an elongated Clusius-Dickel column having a length through which a net cross-flow may be established; applying a higher temperature to one side of the slot and a lower temperature on an opposite side of the slot thereby causing thermal-diffusion and buoyant-convection flow to occur in the slot; and establishing a net cross-flow of a gas mixture comprising a higher density gas and a lower density gas along the length of the slot, wherein the net cross-flow causes, in combination with the convection flow, a spiraling flow in the slot and wherein the spiral flow causes an increasing amount of separation of the higher density gas and the lower density gas along the length of the slot.

In some embodiments of the inventive process, the gas mixture comprises air and carbon dioxide.

In some embodiments of the inventive process, the gas mixture comprises flue gas from a power plant.

In some embodiments of the inventive process, the gas mixture comprises a mixture of isotopes.

In some embodiments of the inventive process, the difference between the higher temperature and the lower temperature is equal to or greater than 5° C.

In some embodiments of the inventive process, the length of the slot is equal to or greater than one meter.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

FIG. 4A is a schematic side view illustrating the spiraling cross-flow along a length of a slot in a channel useful in the inventive process; and FIGS. 4B-4P illustrate a theoretical map of gas separations at progressive points in time in an embodiment of the inventive process; wherein the numbers represent the progressive enrichment (in %) of a hypothetical lighter gas component A in the gas mixture.

FIG. 6 is a schematic isometric view illustrating an example of spiraling cross-flow within the slot of the channel of FIG. 5, with a vertical composition gradient developing along the length of the channel.

DETAILED DESCRIPTION OF THE INVENTION

The invention provides a process and apparatus for separating a gas mixture comprising one or more higher density gas component(s) and one or more lower density gas component(s) in a flowing stream of the gas mixture.

The inventive process for separating a gas mixture comprises providing one or more slots in one or more gas separation channels in the form of an elongated Clusius-Dickel column having a length through which a net cross-flow may be established; applying a higher temperature to one side of the slot thereby causing thermal-diffusion and buoyancy-driven convection flow (buoyant-convective flow) to occur in the slot; and establishing a net cross-flow of a gas mixture comprising a higher density gas and a lower density gas into the slot, wherein the net cross-flow causes, in combination with the convection flow, a spiraling flow along the length of the channel, and wherein the spiral flow causes an increasing amount of separation of the higher density gas and the lower density gas along the length of the channel.

Buoyancy-driven convection flow occurs when two liquids or gases, having different densities, are accelerated by a force. Typically, that force is caused by gravity; and it is generally understood that the words "up", "vertical", and "down" refer to a coordinate direction that is parallel to the direction of gravity. In the illustrated examples of specific embodiments in FIGS. 3-9, the direction of gravity is indicated.

In other embodiments of the inventive process and apparatus, centrifugal forces can be used in place of, or in addition to, the force of gravity, to drive buoyant-convective flow in the gas mixture. Well-known methods of providing a centrifugal force can be used, including rotating or spinning with a motor a container or channel containing the gas mixture around a axis of rotation (e.g., by a centrifuge). In these embodiments, the apparatus can comprise means for applying one or more centrifugal forces to the gas separation channel in such a direction so as to cause the buoyant-convection flow to occur within the slot. For example, such a centrifugal force can be applied in a direction perpendicular to the length, L, of the channel 16 (see, e.g., FIG. 5).

In each embodiment shown in FIGS. 3-9, the force of gravity (indicated by the directional arrow), can be replaced with, or augmented by, a centrifugal force to achieve the same effects and conditions. Depending on the speed of rotation, the centrifugal force can be many times greater than the force caused by gravity.

In other embodiments, the direction of a centrifugal force can be in a direction that is different than the direction of gravity.

Figure 3B:
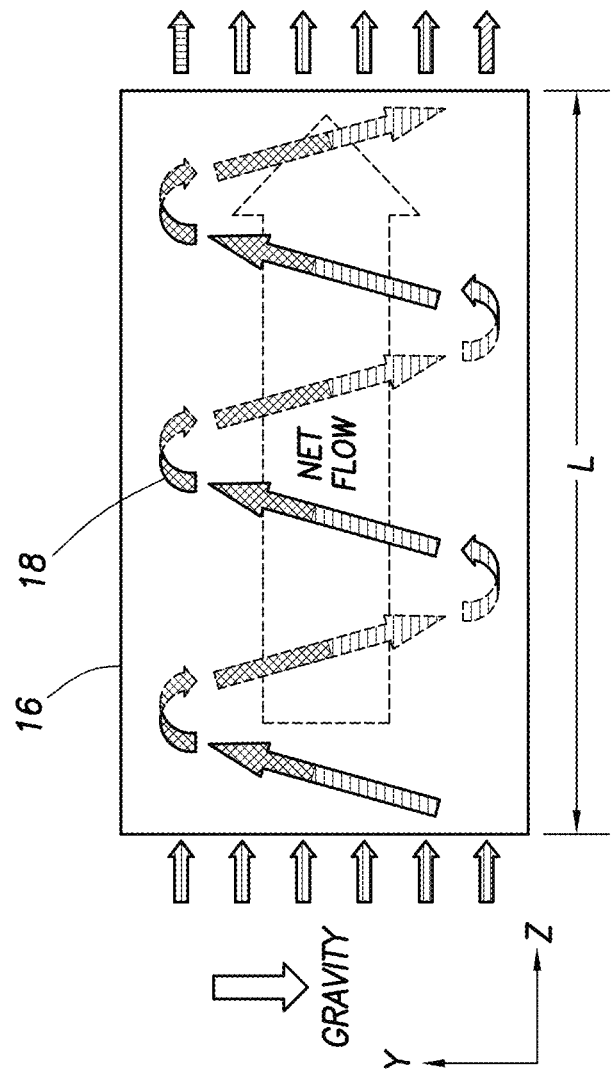
FIG. 3B is a schematic side view illustrating the first embodiment of the inventive apparatus illustrating the net gas flow along the length L of the channel, which occurs in a spiraling cross-flow manner.
Figure 3A:
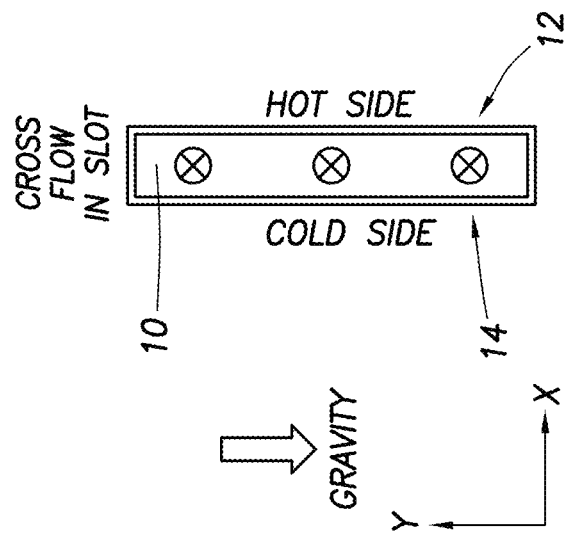
FIG. 3A is a schematic end view illustrating a first embodiment of the inventive apparatus wherein a net cross-flow of a gas mixture flows along a length of L of a channel in a direction perpendicular to the page.

FIGS. 3A and 3B show a first example of a process and apparatus, according to the present invention, in which a Clusius-Dickel type slot 10 is provided having a cooler sidewall 14 and a hotter opposing sidewall 12. In contrast to known Clusius-Dickel columns, which are sealed containers holding a finite amount of gas, the slot useful in the inventive method resides in a gas separation channel 16 having an indeterminate length dimension, L, in a plane perpendicular to the page. Such length, L, is illustrated in the schematic of FIG. 3B.

In the inventive process, a gas mixture having a higher density (or heavier) gas and lower density (or lighter) gas is passed along the length of the slot. The cooler and hotter sidewalls along the length of the slot cause a horizontal temperature gradient across the slot. This horizontal temperature gradient gives rise to horizontal thermal-diffusion and vertical buoyant-convective flows, as described in connection with conventional Clusius-Dickel columns. The flow of the gas mixture along the length of the slot, in combination with the convective flow, causes the gas mixture to move in a spiral path 18 along the length of the channel 16, and the rising and sinking gas streams are moving across each other at an angle (in an advective-convective cross-flow fashion), as is illustrated in FIG. 3B. The spiral flow results in a compositional gradient that develops both vertically in the slot 10, and horizontally along the direction of the gas mixture flow (i.e., in the Z-direction). The cross-hatched and horizontally-hatched arrows of FIG. 3B illustrates such spiral flow wherein the cross-hatched portions of the arrows indicate the downward flow of the higher density gas component, and the horizontally-hatched portions of the arrow indicate the upward flow of the lighter density gas component. In contrast to a conventional Clusius-Dickel column with a fixed amount of gas, in which a progressively larger compositional gradient develops over time, in the inventive process a progressively larger compositional gradient between the lighter and heavier gas components of a gas mixture develops in the direction of flow down the length of the channel. Thus, a continuous stream of a gas mixture can be separated (rather than a fixed volume of gas in a closed column) as shown in the schematic on the right side of FIG. 3B.

Figures 4A, 4B, 4C, 4D:
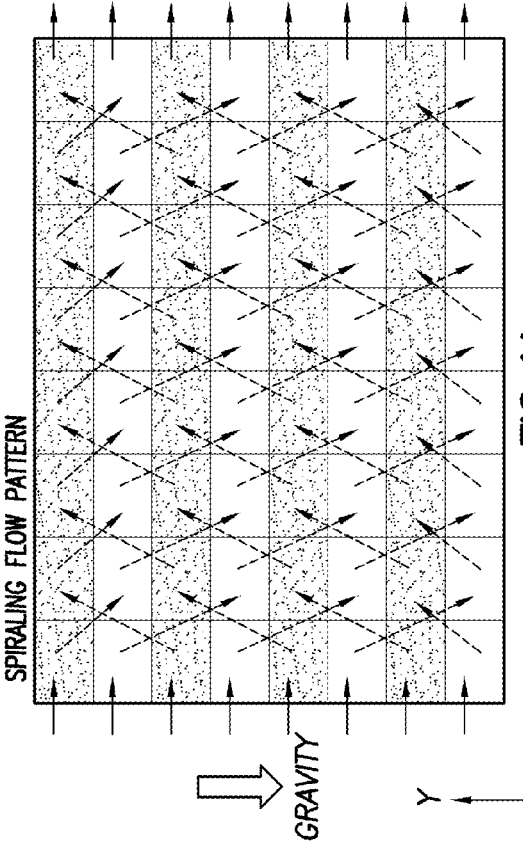

FIG. 4A is a schematic side view illustrating the spiraling cross-flow along a length of a slot in a channel useful in the inventive process. In FIG. 4A, the front side of the channel is hotter than the backside of the channel. Separation in the cross-flow slot of the inventive process occurs by a similar mechanism as in the Clusius-Dickel column, except that the convective-advective flow, shown by the dashed arrows, is in a spiral pattern, as discussed above. In contrast, a conventional Clusius-Dickel column exhibits solely convective flow. In FIG. 4A, the dotted horizontal bands represent the hotter front sidewall and, as can be seen in FIG. 4A, the flow along the hotter front sidewall is upward and to the right. In FIG. 4A, the white horizontal bands represent the cooler backside wall and, as can be seen in FIG. 4A, the flow along the cooler backside is downward and to the right.

Figure 1:
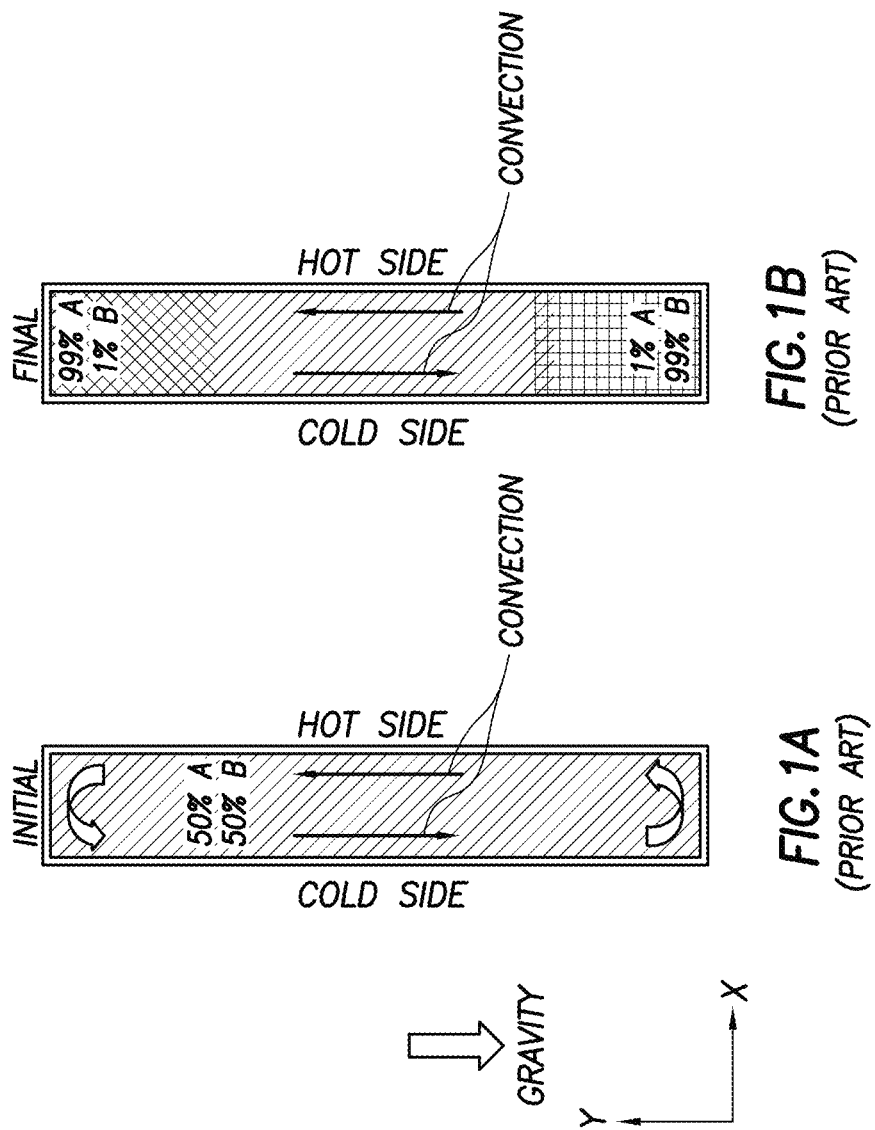
FIG. 1A is a schematic side view illustrating a Clusius-Dickel column having an initial uniform gas mixture at the onset of application of a horizontal thermal gradient.
FIG. 1B is a schematic side view of the Clusius-Dickel column shown in FIG. 1A, illustrating the separation of the lighter and heavier gases following the combination of a horizontal thermal gradient and convective flow which flows upward on the hotter side of the column and downward on the cooler side of the column as indicated by the arrow.
Figure 2:
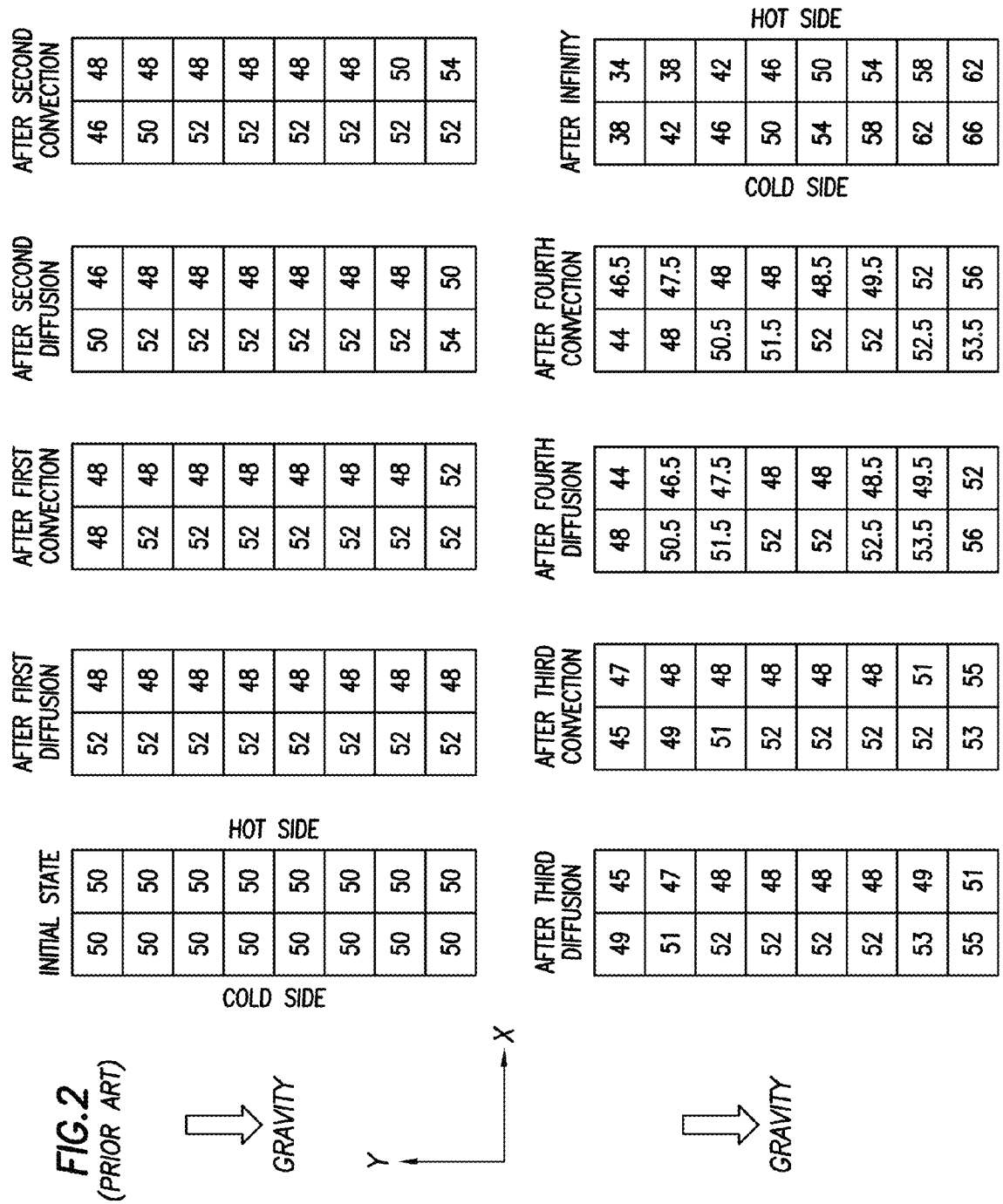
FIG. 2 is a schematic side view illustrating the increasing concentration of a heavier gas over time in a theorized Clusius-Dickel column having 8 vertically discretized cells, and wherein the column is hotter on its right edge and cooler on its left edge.

Referring to FIGS. 4A-4P, the channel is divided into a number of 3-dimensional cells for analytical purposes: 4 cells vertically spaced, 2 cells horizontally spaced between the hot and cold side walls (shown here paired vertically, with the hot cell on top), and 8 cells lengthwise spaced along the length of the channel, for a total of 64 cells. In other words, the shaded cells in FIG. 4A represent the "front" or hot side, while the un-shaded cell immediately below each shaded cell represents the "back" or cold side. In reality, the two cells are actually adjacent to each other in the slot, i.e., one in front of the other. They were split in FIG. 4A to better illustrate the effects of flow vs. diffusive equilibration at each step in the numerical analysis. As discussed previously in connection with FIG. 2, the slot is not in reality so discretized.

FIGS. 4B through 4P (which map to the cell locations shown in FIG. 4A) represent a progression of the development of compositional concentration gradients of a hypothetical lighter gas component 'A', as a function of time, as the lighter and heavier gas components separate from each. The numbers in the cells represent the progressive enrichment (in %) of the lighter gas component of an initially 50/50 gas mixture of light and heavy components. The 'star' tracks a single gas volume along a spiral flow path.

As can be seen in FIGS. 4B-4P, the magnitude of the vertical composition gradient increases in the direction of flow along the length of the channel. The theoretical volume of gas shown by the 'star' in a sample cell exhibits a compositional increase of about 7.5% (i.e., 57.5%-50%) at the exit, in comparison to the composition of the gas mixture of 50/50 as initially flowed into the slot, following a single revolution along the spiral flow path. For example, for a gas mixture volume initially composed 50% of a lower density gas A and 50% of a higher density gas B entering the channel at the left side, the gas mixture leaving the channel at the cooler side of the slot would contain 57.5% of heavier gas B at the bottom of the channel and 42.5% of lighter gas A at the bottom of the channel. Likewise, the gas leaving the channel at the hotter side of the slot would contain 57.5% of lighter gas A at the top of the channel and 42.5% of heavier gas B at the top of the channel, following one spiral revolution along the length of the channel.

Figure 5:
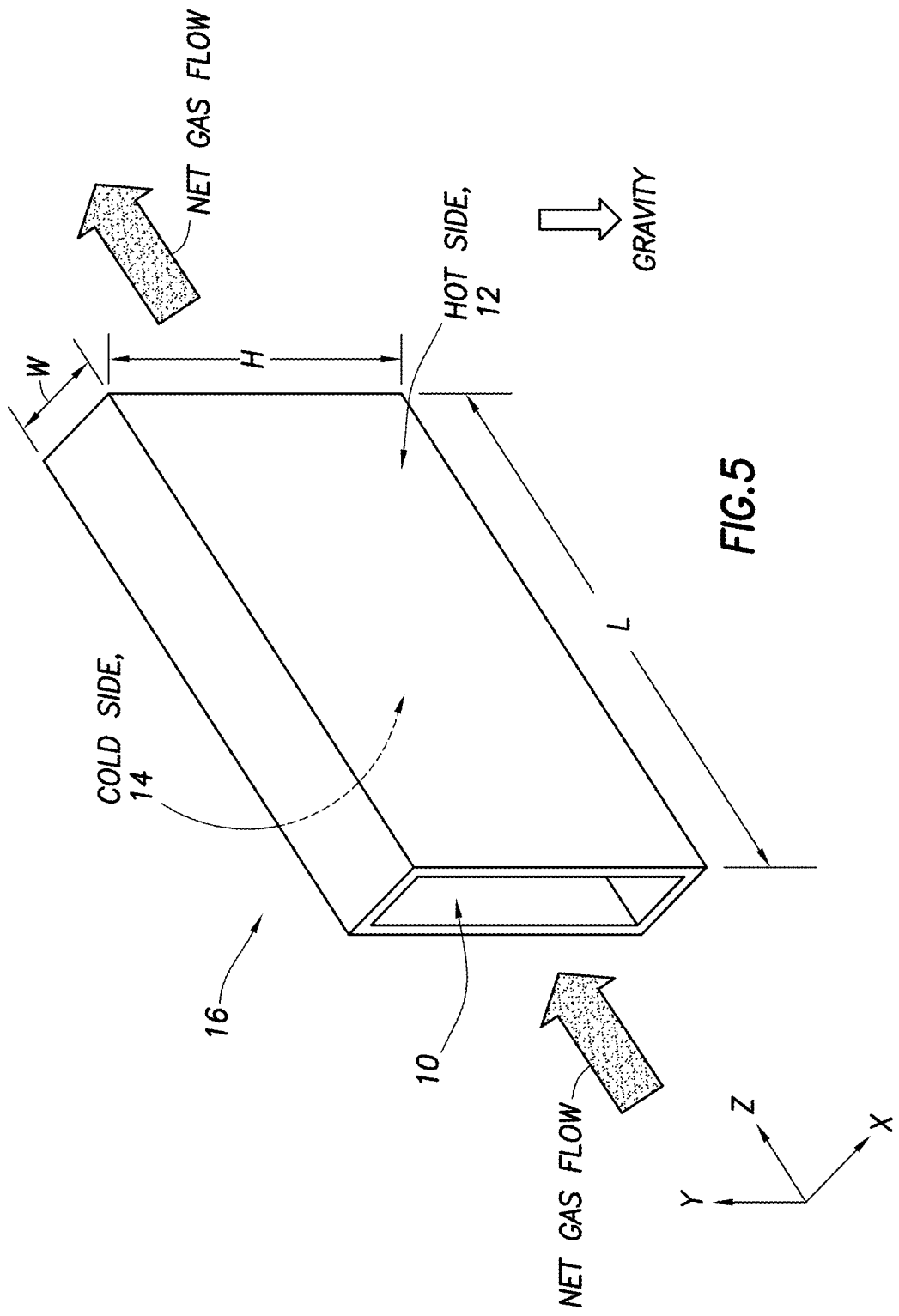
FIG. 5 is a schematic isometric view of another embodiment of the inventive gas separation apparatus.

FIG. 5 is a schematic isometric view of another embodiment of the inventive gas separation apparatus. Channel 16 comprises a slot 10 running the entire length of the channel; a hot side wall 12, a cold side wall 14, a vertical height dimension=H, a horizontal width dimension=W, and a length dimension=L. In some embodiments, H>W, and L>>H. The apparatus can further comprise well-known means for heating and cooling the sidewalls of channel 16. The aspect ratios of the dimensions of the various sides of the channel 16 (e.g., H/W, W/L, H/L, etc.) are not limited to the specific examples shown in the accompanying Figures. For example, the length dimension of the channel, in one embodiment, is at least twice as long as the width and/or height. All individual values and subranges of two times the height or width are disclosed and included herein.

FIG. 6 is a schematic isometric view illustrating an example of a spiraling cross-flow pattern 18 within the slot of the channel of FIG. 5, with a vertical composition gradient developing along the length of the channel. Buoyant-convection loop 20 is illustrated.

Figure 7:
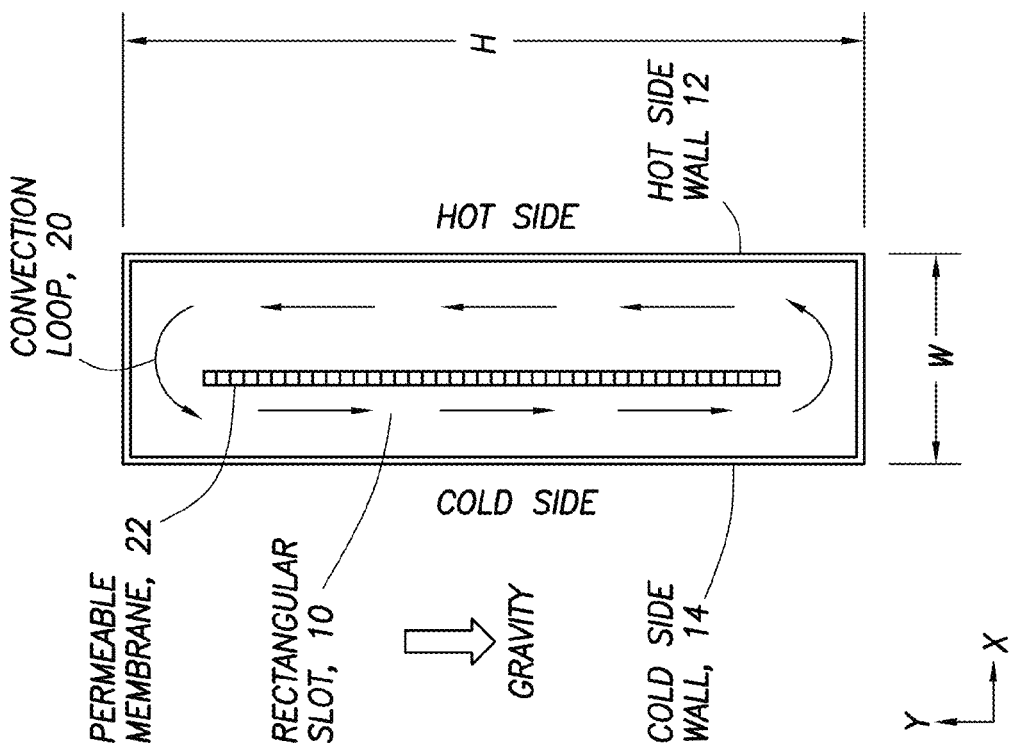
FIG. 7 is a schematic end view illustrating an embodiment of a rectangular slot with a permeable membrane separating hot and cold sides of the slot.

FIG. 7 is a schematic end view illustrating an embodiment of a rectangular slot 10 with an (optional) permeable membrane 22 disposed vertically within the slot for reducing or preventing mixing of the hot and cold zones, while simultaneously allowing diffusion of gaseous species through the membrane 22 in a horizontal direction due to thermal diffusion (i.e., the Soret Effect). Note that the horizontal position of permeable membrane 22 is located, in this example, more to the left side than the right (i.e., the membrane does not need to be placed exactly in the middle of slot 10). More than one permeable membrane can be used to provide additional partitioning of flow zones, as needed. In some embodiments, permeable membrane 22 can comprise a perforated sheet of material (such as a metal) with circular perforations (holes) or perforations comprising an array of elongated slots.

Figure 8A:
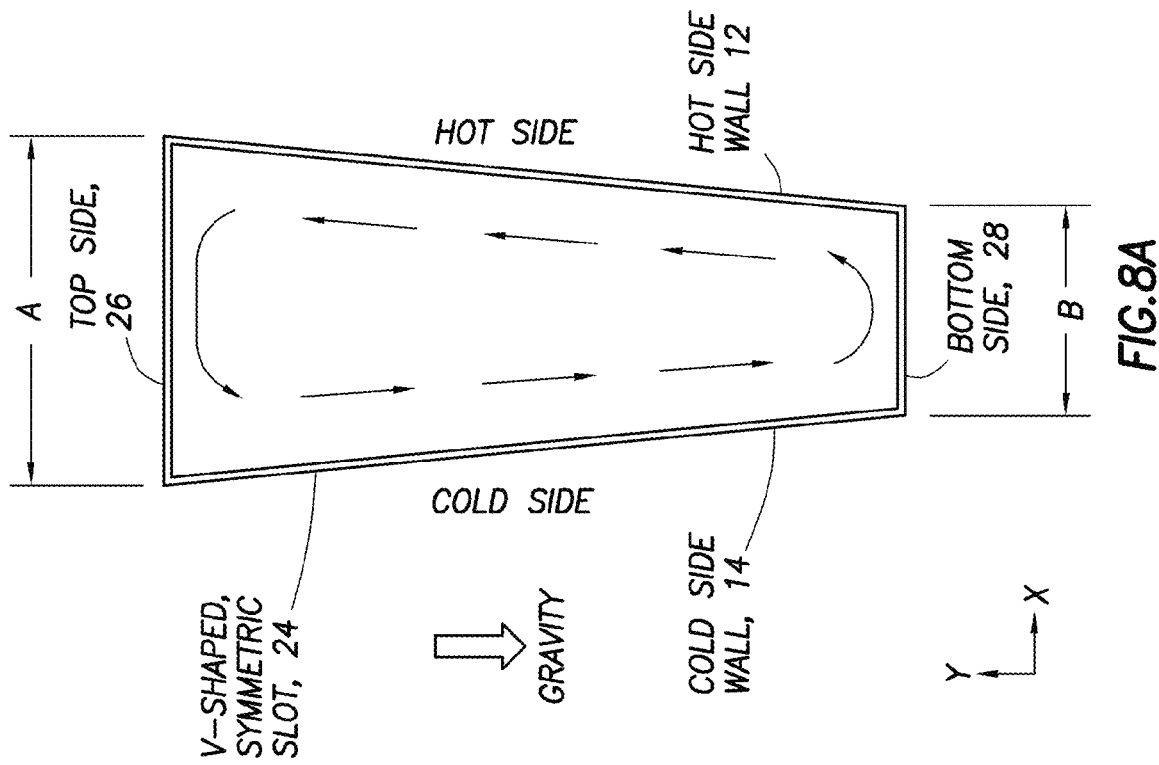
FIG. 8A is a schematic end view illustrating an embodiment of a symmetric V-shaped slot, with straight sidewalls.

FIG. 8A is a schematic end view illustrating an embodiment of a symmetric, V-shaped slot 24, with straight side walls 12 and 14 that are slanted to make a V-shape. Topside 26 has a width=A, and bottom side 28 has a width=B. In some embodiments, A>B, because hotter gases will expand more and rise to the top of slot 24.

Figure 8B:
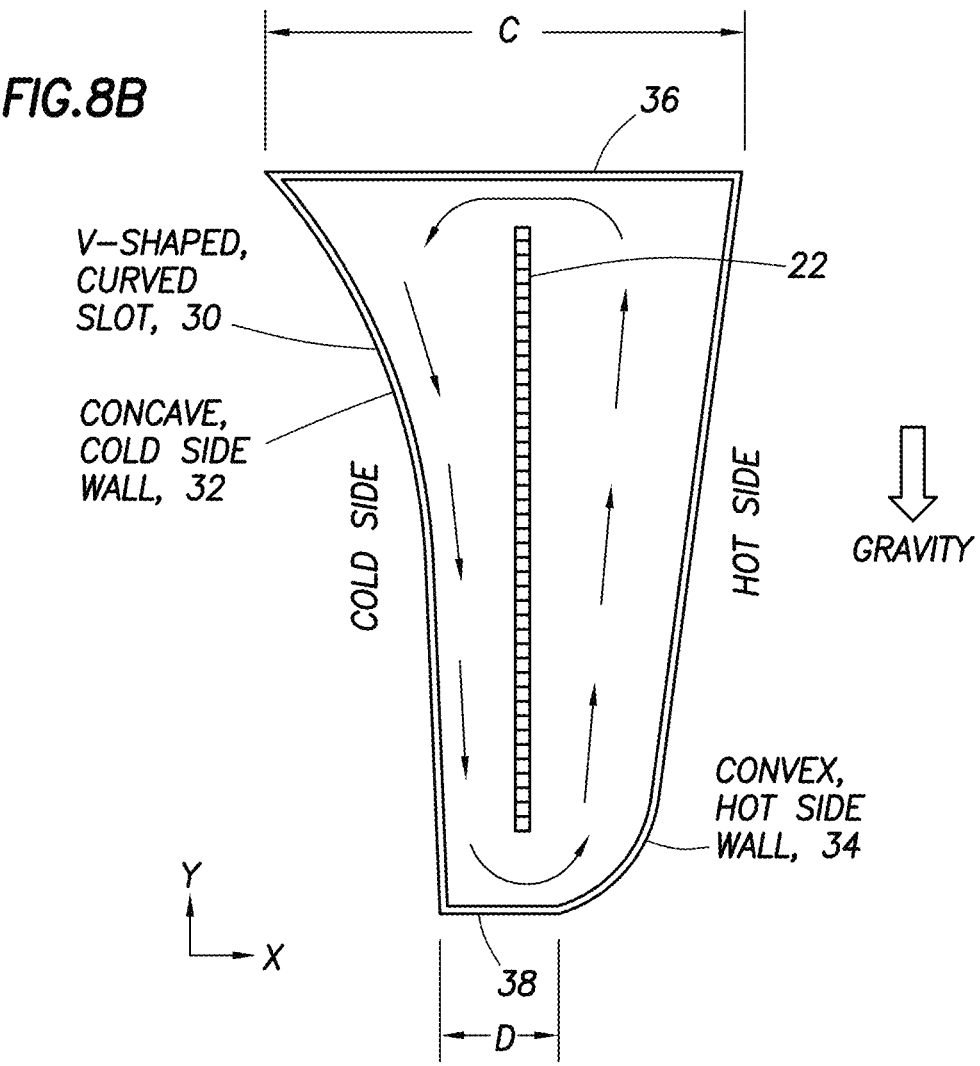
FIG. 8B is a schematic end view illustrating an embodiment of a non-symmetric V-shaped slot, with curved sidewalls and a permeable membrane.

FIG. 8B is a schematic end view illustrating an embodiment of a non-symmetric V-shaped slot 30, with curved sidewalls 32, 24 and an optional permeable membrane 22. The shape of the curved sidewalls can be selected to reflect the rate of heat transfer from the walls to the gas. For example, hot sidewall 34 can have a convex shape; widening rapidly at the bottom and less rapidly at the top because the temperature differential between the wall and the gas is greater at the bottom. In contrast, cold sidewall 32 can have a concave shape, with the wall narrowing rapidly at the top and less rapidly at the bottom because the temperature differential between the wall and the gas is greater at the top. Topside 36 has a width=C, and bottom side 38 has a width=D. In some embodiments, C>D, because hotter gases will expand more and rise to the top of slot 24.

Figure 9:
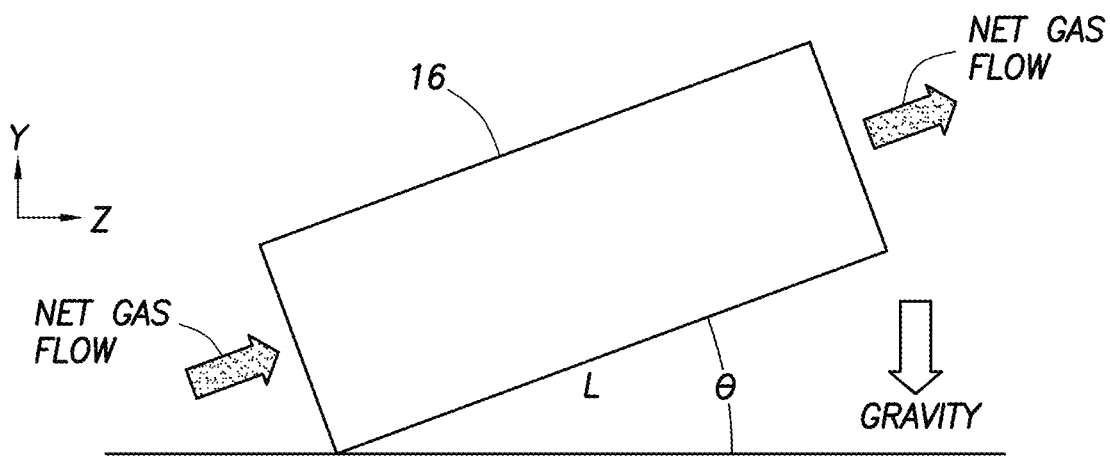
FIG. 9 is a schematic side view illustrating an embodiment of a gas separation channel that is tilted at an angle, $\theta$, with respect to a horizontal axis.

FIG. 9 is a schematic side view illustrating an embodiment of a gas separation channel 16 that is tilted along the length dimension, L, at an angle, θ, with respect to a horizontal axis, wherein the horizontal axis is perpendicular to gravity's direction. Tilting the channel 16 with respect to the direction of gravity (either tilted up or tilted down) can affect the magnitude and shape of the buoyant-convection flow loop component of the spiral flow path of the gas mixture as it flows up (or down) channel 16.

Figure 10A:
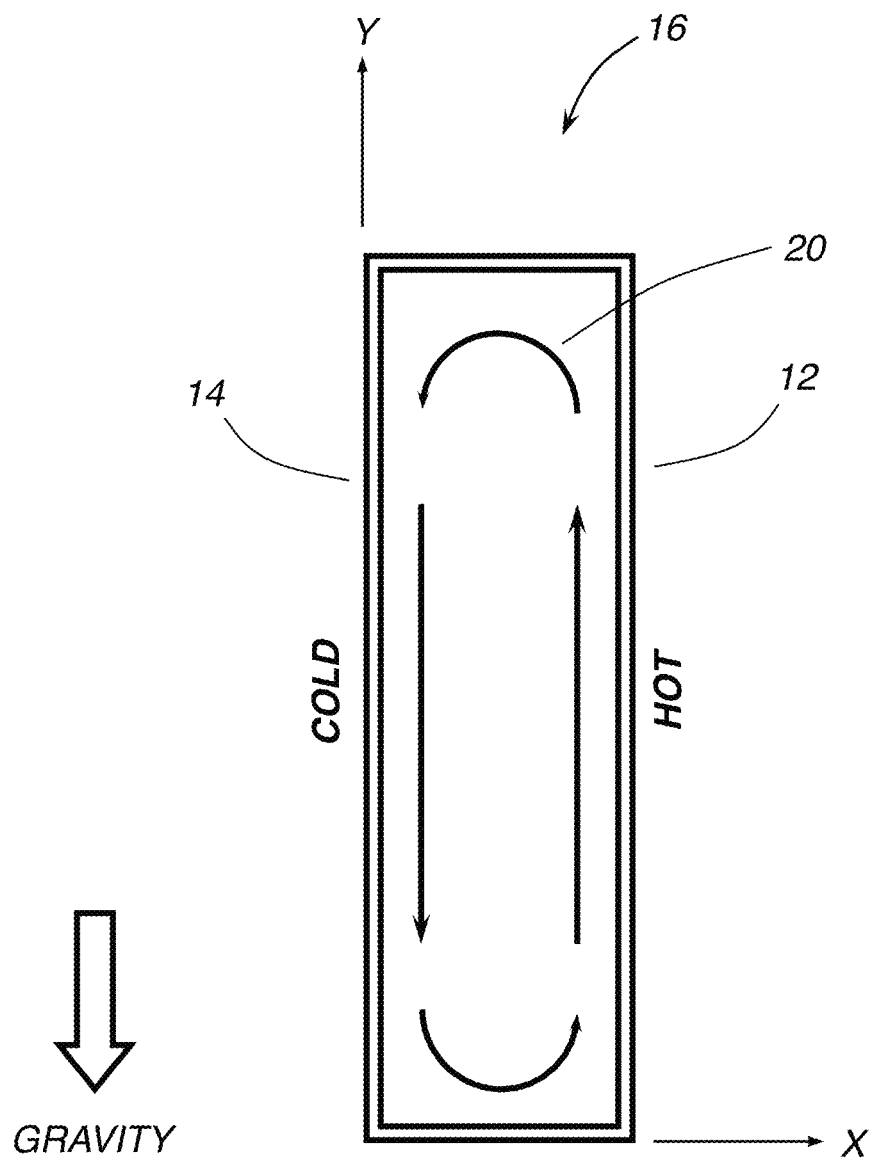
FIGS. 10A, 10B, 10C are schematic end views of three rectangular slot embodiments with different orientations with respect to the x-axis.
Figure 10B:
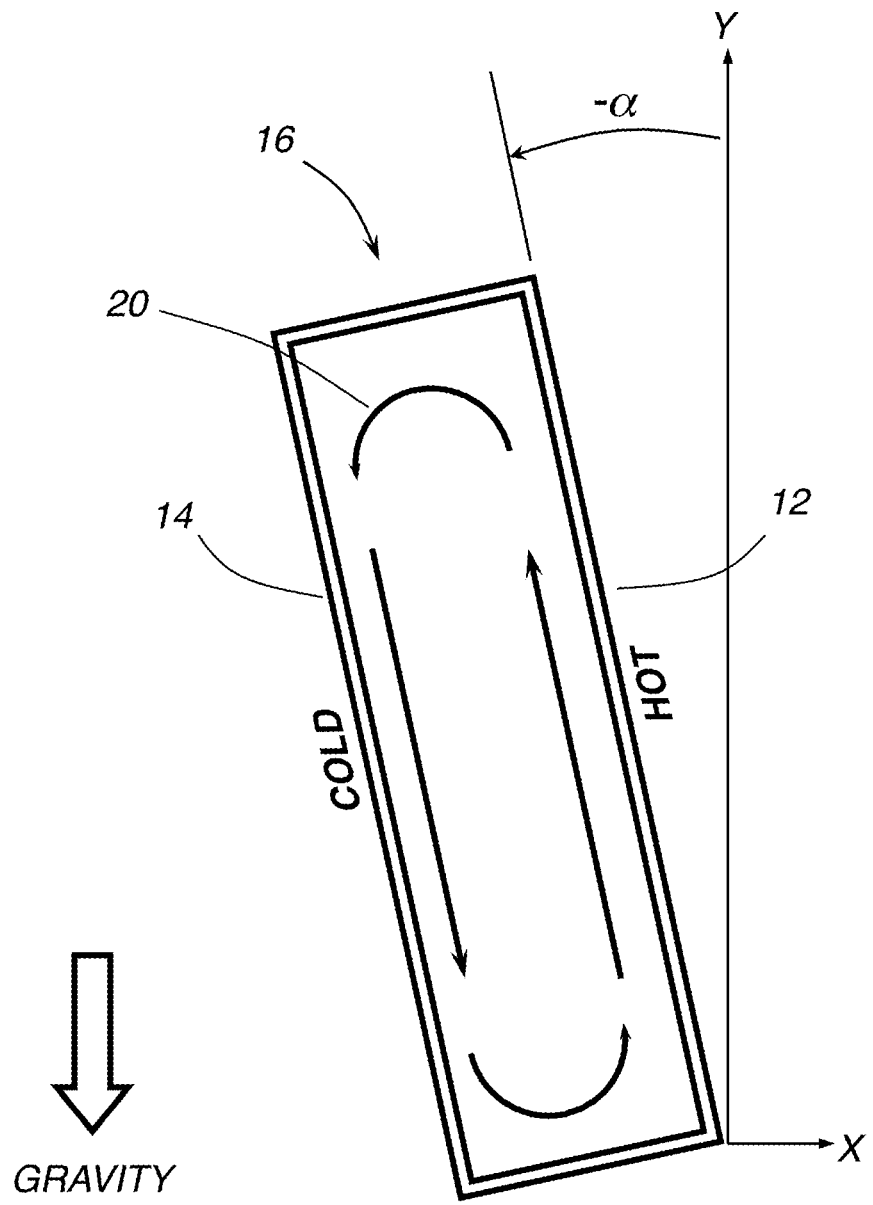
Figure 10C:
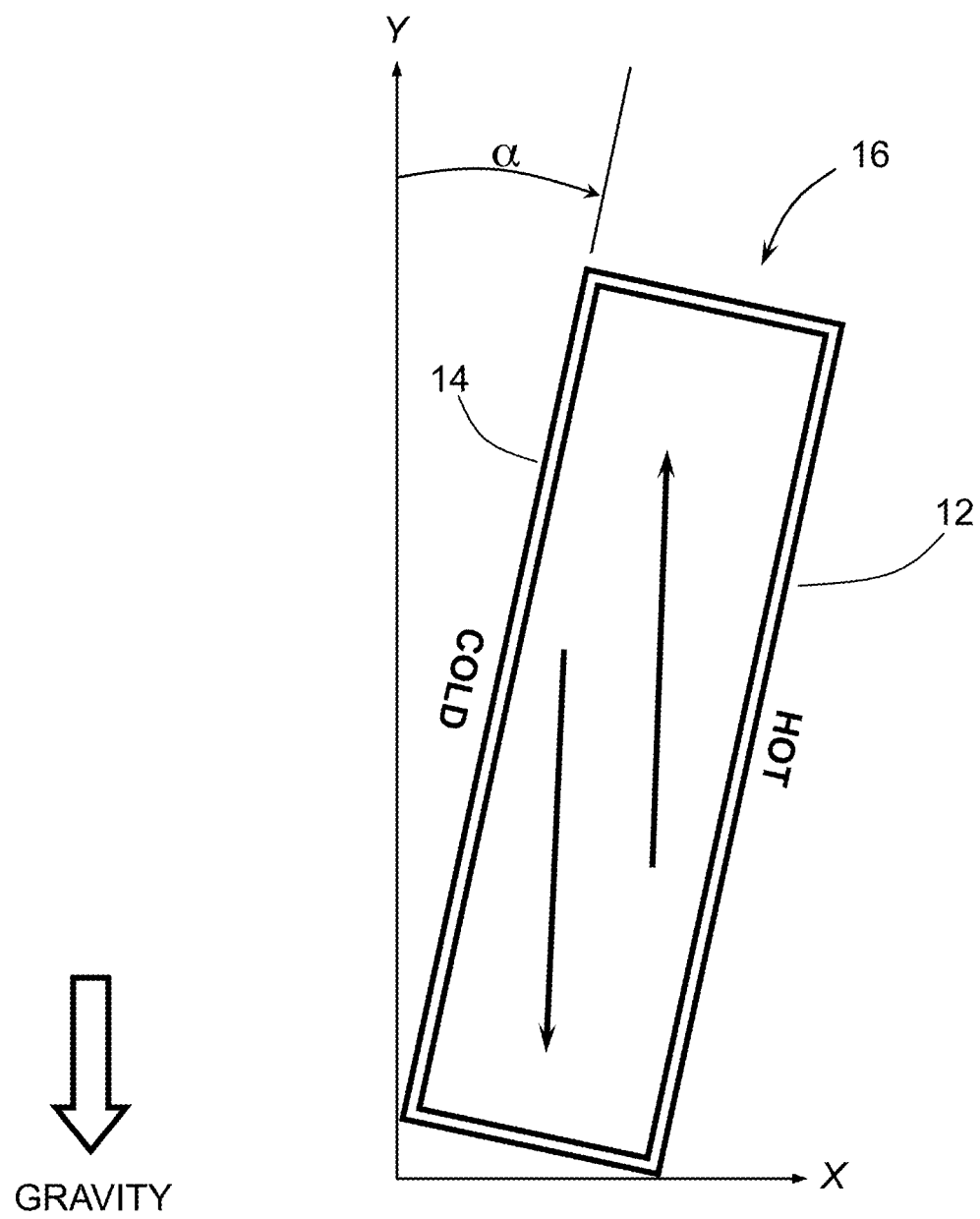

FIGS. 10A, 10B, 10C show schematic end views of three rectangular slot embodiments with different orientations with respect to the horizontal x-axis. FIG. 10A shows rectangular slot 16 with hot sidewall 12, cold sidewall 14, and convective loop 20 caused by buoyant-convective flow within the slot, with the slot oriented in a neutral orientation. The width dimension, W, of the slot aligns with the X-axis, and the height dimension, H, aligns with the Y-axis.

In FIG. 10B, rectangular slot 16 is tilted (tipped) as a rigid body at a negative tilt angle, α<0, (i.e., in a counter-clockwise direction) as measured between a vertical side wall 12 or 14 and the Y-axis, wherein the Y-axis coincides with the direction of gravity. In this "tilted-left" slot orientation, the convection flow loop 20 is stable and the flow stays attached to the nearest wall. This is because the hotter gas rises up to meet the hot sidewall 12 and the cooler gas falls to meet the cold sidewall 14; both of which keeps the flow streams attached. In some embodiments, the tilt angle, α, can range from −1° to −45°. In preferred embodiments, the tilt angle, α, can range from −5° to −15°.

In contrast, in FIG. 10C, rectangular slot 16 is tilted (tipped) as a rigid body at a positive tilt angle, α>0, (i.e., in a clockwise direction) as measured between a vertical sidewall 12 or 14 and the Y-axis, wherein the Y-axis coincides with the direction of gravity. In this "tilted-right" slot orientation, the convection flow loop 20 is unstable and the flow does not stay attached to the nearest wall. This is because the hotter gas rises up away from hot sidewall 12 and detaches, while the cooler gas falls away from the cold sidewall 14 and also detaches; both of which lead to unstable flow.

Figure 11A:
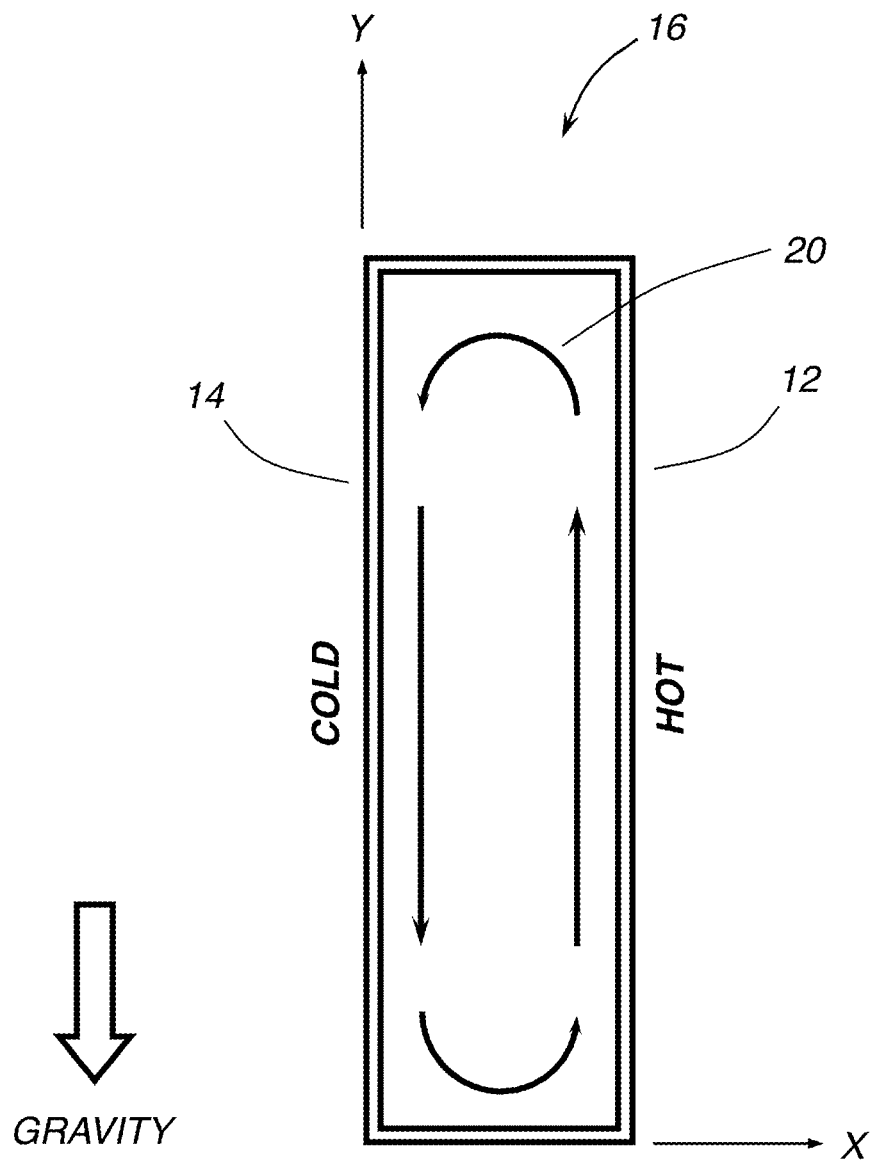
FIGS. 11A, 11B, 11C are schematic end views of three parallelogram slot embodiments with different orientations with respect to the y-axis.
Figure 11B:
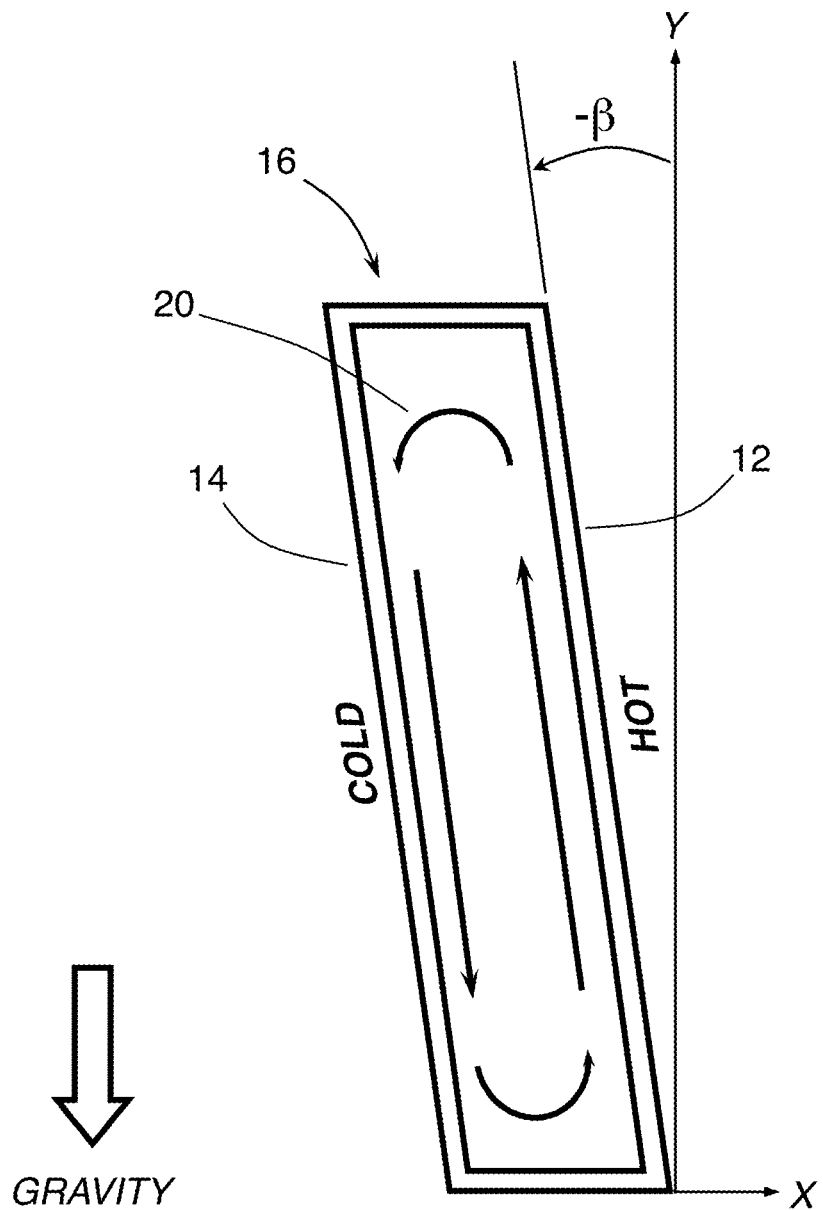
Figure 11C:
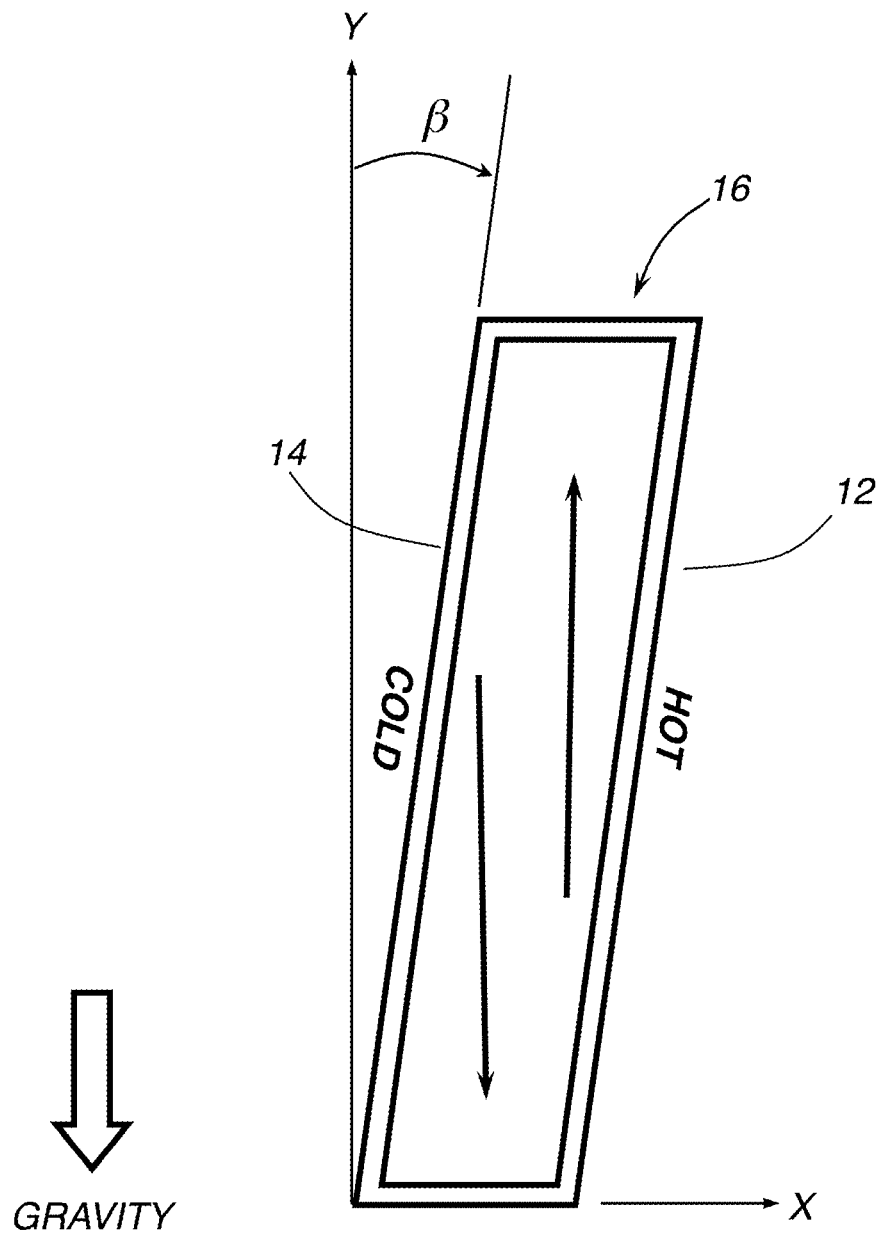

FIGS. 11A, 11B, 11C show schematic end views of three parallelogram slot embodiments with different orientations with respect to the vertical Y-axis. FIG. 11A shows rectangular slot 16 with hot sidewall 12, cold sidewall 14, and convective loop 20 caused by buoyant-convective flow within the slot, with the slot oriented in a neutral orientation. The width dimension, W, of the slot aligns with the X-axis, and the height dimension, H, aligns with the Y-axis.

In FIG. 11B, slot 16 has been skewed into a parallelogram shape that is defined by a negative skew angle, β<0, (i.e., in a counter-clockwise direction) as measured between a vertical side wall 12 or 14 and the Y-axis, wherein the Y-axis coincides with the direction of gravity. With this "tilted-left" parallelogram slot geometry, the convection flow loop 20 is stable and the flow stays attached to the nearest wall. This is because the hotter gas rises up to meet the hot sidewall 12 and the cooler gas falls to meet the cold sidewall 14, both of which keeps the flow streams attached. In some embodiments, the skew angle, β, can range from −1° to −45°. In preferred embodiments, the skew angle, β, can range from −5° to −15°.

In FIG. 11C, slot 16 has been skewed into a reverse parallelogram shape that is defined by a positive skew angle, β>0, (i.e., in a clockwise direction) as measured between a vertical sidewall 12 or 14 and the Y-axis, wherein the Y-axis coincides with the direction of gravity. With this "tilted-right" parallelogram slot geometry, the convection flow loop 20 is unstable and the flow does not stay attached to the nearest wall. This is because the hotter gas rises up away from hot sidewall 12 and detaches, while the cooler gas falls away from the cold sidewall 14 and also detaches; both of which lead to unstable flow.

Figure 12:
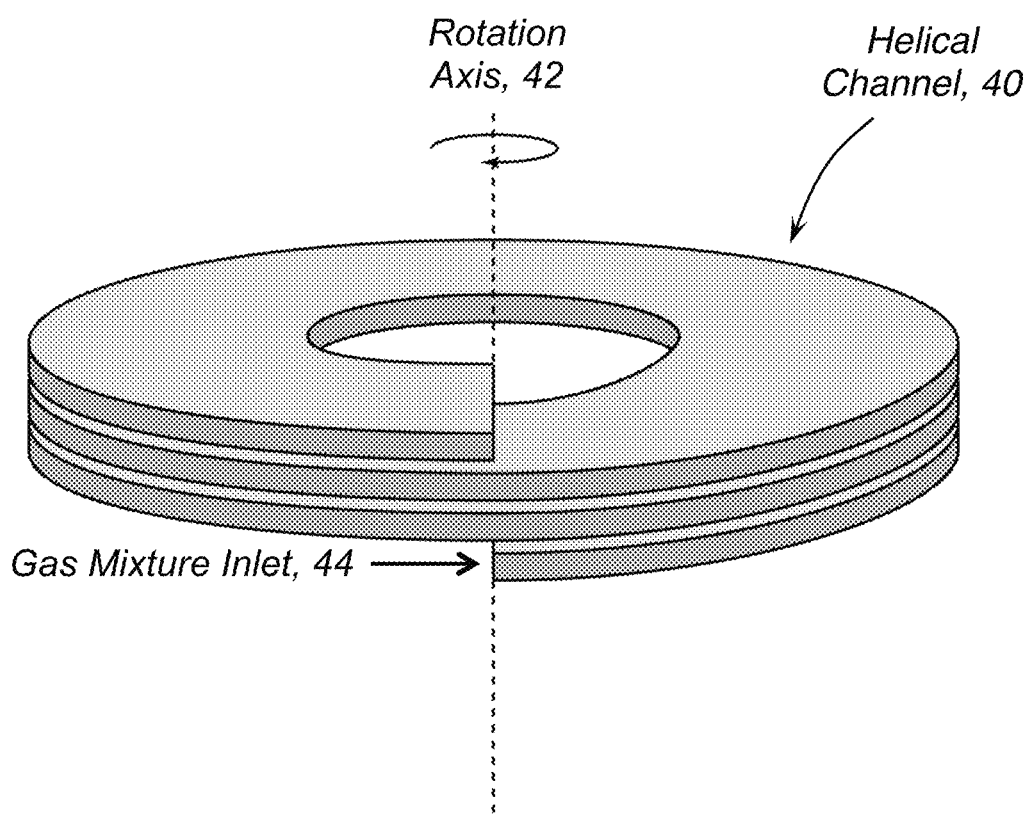
FIG. 12 is a schematic isometric view of an example of a gas separation channel with a rectangular cross-section, which is wrapped around a central axis in the shape of a helical spiral-ramp.

FIG. 12 shows a schematic isometric view of an example of a gas separation channel with a rectangular, pancake-shaped cross-section. Channel 40 is "wrapped" around a central axis in the shape of a helical spiral (i.e., a helical spiral-ramp shape). In FIG. 12, channel 40 is wrapped three complete revolutions about the central axis 42 Optionally, the helical spiral-shaped channel 40 can be rotated (e.g., by a motor or centrifuge) about a central axis of rotation 42, which causes a centrifugal force to act in a radial direction on channel 40 and on the gas mixture inside (which enters channel 40 through gas mixture inlet 44).

Any of the embodiments of the gas separation apparatus described above can independently comprise any combination of the following design features: rectangular-shaped slot, symmetric-shaped slot, V-shaped slot, tilted slot, parallelogram-shaped slot, straight side walls, curved side wall(s), one or more permeable membranes or perforated dividers, a tilted channel, and/or a helical spiral-wrapped channel.

Gas channel 16 (see, e.g. FIGS. 3B, 5, and 6) is not limited to being a straight channel; it can be curved in one or more directions. It is to be understood that the hot and cold sidewalls (12 and 14 in the Figures), can generally be interchanged left-to right and right-to-left without affecting the principles of operation of the process or apparatus of the present invention. Exceptions to this general rule include the example shown in FIG. 8B, where the cold sidewall 32 is concave-shaped and the hot sidewall 34 is concave-shaped.

In FIGS. 3B, 5 and 6, the direction of the inlet gas mixture flowing into the open inlet of channel 16 is in a direction parallel to the Z-axis (i.e., parallel to the length dimension of channel 16). However, in other embodiments, the direction of the inlet gas mixture can be at a pre-determined injection angle (or multiple injection angles, for multiple inlet gas streams) that is non-parallel to the Z-axis. For example, these pre-determined injection angle(s) can be chosen to preferentially induce a swirling flow as the gas mixture enters the inlet of channel 16.

As used herein, percentages of the gas components in the gas mixture may be in molar %, weight %, or volume % units. A skilled artisan would understand that the compositional gradient will depend upon a large number of factors, including for example, the rate of net cross-flow of the gas mixture through the channel, the temperature difference imparted on either side of the slot, the length of the channel, the distance between the walls of the slot, and the compositional gradient of the gas mixture as flowed into the slot (i.e., initial gas mixture composition). Thus, the amount or separation of the gas components, or the compositional gradient in comparison to the initial gas mixture, may vary considerably depending upon such factors. The inventive process is not intended to be limited to any particular combination of such factors or to any particular minimum amount of compositional gradient per spiral revolution of a gas mixture volume.

All ranges and subranges of rate and amount of compositional gradient in comparison to the initial gas mixture composition is disclosed herein and included herein. For example, the compositional gradient, in comparison to the initial gas mixture composition, per spiral revolution, may be equal to or greater than 0.5%, or in the alternative 1.0%, or in the alternative 2.0%, or in the alternative 3.0%, or in the alternative 4.0%, or in the alternative 5.0%, or in the alternative 6.0%, or in the alternative 7.0%, or in the alternative 8.0% and so on up to a theoretical maximum of complete separation of the higher and lower density gas components.

Likewise the temperature gradient, which may be applied across the slot used in the inventive process, is not intended to be limited herein. The temperature difference across or within the slot may be greater than 0° C., or in the alternative greater than 2° C., or in the alternative greater than 5° C., or in the alternative greater than 10° C., or in the alternative greater than 20° C., or in the alternative greater than 50° C., or in the alternative greater than 300° C., by way of example.

Likewise the dimensions of the slot, which may be used in the inventive process, are not intended to be limited herein. Likewise the flow rate of the gas mixture into and through the length of the slot is not intended to be limited herein.

The geometry of the slot, which may be used in the inventive process, and apparatus is further not intended to be limited herein. While conceptualized herein as a slot, conventional Clusius-Dickel columns are typically vertical tubes cooled by water flowing around the tube exterior and heated within by a current-carrying wire along the internal axis of the tube. Herein slots useful in the inventive process have been conceptualized as having two sides and a length, but any geometry permitting both convective and advective flow may be used in various embodiments of the invention. The inventive process may further utilize one or more slots wherein the slots may have different geometries or the same geometry.

The geometry of the channel 16, which may be used in the inventive process and apparatus, is further not intended to be limited herein. In the specific examples shown in the Figures, channel 16 is illustrated as being straight. However, in other embodiments, the channel may be non-straight (e.g., curved along the length of the channel, L). The degree of non-straightness can vary greatly, i.e., from a small amount of concave or convex curvature, to a large degree of curvature (e.g., channel 16 may be formed as a helical spiral shape wrapped around a central axis, as shown in FIG. 12).

The inventive process and apparatus may be used to treat any gas mixture comprising at least one higher density component and at least one lower density component. Because the process of the invention does not rely solely upon the gravitational forces, the inventive process is particularly suited to separation of gas mixtures wherein the gas components have very slight density differences, such as in gaseous mixtures of isotopes. The present invention may be used to separate a continuous gas mixture stream, thereby permitting separation of gaseous components of large amounts of gas mixtures. For example, the inventive process could be employed to separate excess carbon dioxide from air or flue gas streams for long-term geologic storage of the carbon dioxide, or alternatively, for use in production of synthetic fuels.

The inventive process and apparatus may be used to substantially separate higher and lower density gases. As used herein, "substantially separate" or "substantially separated" means that the gas mixture is separable or separated into a higher density gas stream having 5% or less of the lower density gas and a lower density gas stream having 5% or less of the higher density gas.

The inventive process and apparatus may also be used as a pre-concentrator, for the purpose of pre-concentrating a particular species or component of a gas mixture before being acted on by a subsequent process (e.g., a chemical process).

The inventive process and apparatus may also be used as a post-concentrator, for the purpose of post-concentrating a particular species or component of a gas mixture after being acted on by a prior process (e.g., a chemical process).

The present invention may be embodied in other forms without departing from the spirit and the essential attributes thereof, and, accordingly, reference should be made to the appended claims, rather than to the foregoing specification, as indicating the scope of the invention.

We claim:

1. An apparatus for separating higher and lower density gas components comprising:
    an elongated gas separation channel having a length dimension, L, and having a cross-sectional shape defining a slot having a width dimension, W, and a height dimension, H;
    an open gas entry side configured to accept a gas flow;
    an open gas exit side;
    wherein the slot comprises two opposing sidewalls defined by the length and height dimensions, a top wall defined by the width and the length dimensions, and a bottom wall defined by the width and the length dimensions;
    and wherein one of the two opposing sidewalls is maintained at a temperature less than the other one of the two opposing sidewalls; and
    further comprising a gas mixture comprising a higher density gas component and a lower density gas component wherein the gas mixture flows in a spiral flow along the length dimension of the channel.

2. The apparatus of claim 1 wherein the length dimension is at least twice as long as the width dimension.

3. The apparatus of claim 1 wherein the length dimension is at least twice as long as the height dimension.

4. The apparatus of claim 1 further comprising a semi-permeable gas membrane located between the two opposing sidewalls and extending at least some portion along the length dimension of the channel.

5. The apparatus of claim 1, further comprising means for applying one or more centrifugal forces to the gas separation channel in such a direction so as to cause the buoyant-convection flow to occur within the slot.

6. The apparatus of claim 1 wherein the channel is tilted along its length dimension at an angle, θ, with respect to a horizontal axis, wherein the horizontal axis is oriented perpendicular to the direction of gravity.

7. The apparatus of claim 1, wherein the slot is tilted at a negative tilt angle, α<0, in a counter-clockwise direction when facing towards the open gas entry side; wherein the tilt angle is measured between a sidewall and a vertical Y-axis; and wherein the Y-axis is parallel to the direction of gravity.

8. The apparatus of claim 7, wherein the tilt angle, α, ranges from −5° to −15°.

9. The apparatus of claim 1, wherein the slot is skewed into a parallelogram shape that is defined by a negative skew angle, β<0, (i.e., in a counter-clockwise direction); wherein the skew angle is measured between a sidewall and a Y-axis; and wherein the Y-axis coincides with the direction of gravity.

10. The apparatus of claim 9, wherein the skew angle, β, ranges from −5° to −15°.

11. The apparatus of claim 1, wherein the channel has a helical spiral-ramp shape, wrapped at least one complete revolution around a central axis.

12. The apparatus of claim 11, further comprising means for generating centrifugal forces by rotating the channel about the central axis.

13. An apparatus for separating higher and lower density gas components comprising:
   a channel having a first width dimension, a second width dimension, a height dimension, and a length dimension, wherein the first width dimension does not equal the second width dimension;
   an open gas entry side configured to accept a gas flow;
   an open gas exit side;
   wherein two opposing sides are defined by the length and height dimensions, a top is defined by the first width and the length dimensions and a bottom is defined by the second width and the length dimensions;
   and wherein one of the two opposing sides is maintained at a temperature less than the other one of the two opposing sides; and
   wherein at least one of the two opposing sides curves outwardly from the bottom to the top.

14. The apparatus of claim 13 wherein the first width dimension is greater than the second width dimension.

15. The apparatus of claim 13 wherein the length dimension is at least twice as long as the first width dimension.

16. The apparatus of claim 13 wherein the length dimension is at least twice as long as the height dimension.

\* \* \* \* \*